United States Patent
Saito et al.

(10) Patent No.: US 9,069,796 B2
(45) Date of Patent: Jun. 30, 2015

(54) INFORMATION PROCESSING SYSTEM, COMPUTER-READABLE NON-TRANSITORY STORAGE MEDIUM, INFORMATION PROCESSING METHOD AND INFORMATION PROCESSOR

(71) Applicant: NINTENDO CO., LTD., Kyoto (JP)

(72) Inventors: Masafumi Saito, Tokyo (JP); Miyuki Iwasawa, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 111 days.

(21) Appl. No.: 13/745,290

(22) Filed: Jan. 18, 2013

(65) Prior Publication Data

US 2013/0217504 A1  Aug. 22, 2013

(30) Foreign Application Priority Data

Feb. 21, 2012  (JP) .................. 2012-035351
Feb. 21, 2012  (JP) .................. 2012-035352

(51) Int. Cl.
*G06F 17/30* (2006.01)
*A63F 13/30* (2014.01)

(52) U.S. Cl.
CPC .... *G06F 17/30283* (2013.01); *G06F 17/30002* (2013.01); *A63F 13/12* (2013.01); *A63F 2300/405* (2013.01); *A63F 2300/408* (2013.01); *A63F 2300/5566* (2013.01); *A63F 2300/6036* (2013.01); *A63F 2300/636* (2013.01); *A63F 2300/204* (2013.01); *A63F 2300/8011* (2013.01)

(58) Field of Classification Search
CPC .................. A63F 13/12; A63F 2300/408
See application file for complete search history.

(56) References Cited

U.S. PATENT DOCUMENTS

| | | | |
|---|---|---|---|
| 2004/0087369 A1* | 5/2004 | Tanaka et al. | 463/42 |
| 2006/0106963 A1* | 5/2006 | Sasaki et al. | 710/110 |
| 2011/0060825 A1* | 3/2011 | Ooe et al. | 709/224 |
| 2012/0010000 A1* | 1/2012 | Masuda et al. | 463/43 |
| 2012/0021778 A1* | 1/2012 | Ho et al. | 455/457 |
| 2012/0030393 A1* | 2/2012 | Ganesh et al. | 710/303 |
| 2012/0068952 A1* | 3/2012 | Slaby et al. | 345/173 |
| 2012/0142433 A1* | 6/2012 | Perlman et al. | 463/42 |
| 2013/0097518 A1* | 4/2013 | Pearcy | 715/741 |

FOREIGN PATENT DOCUMENTS

| | | |
|---|---|---|
| EP | 1 872 838 | 1/2008 |
| EP | 2 389 993 | 11/2011 |
| JP | 2004-136009 | 5/2004 |

OTHER PUBLICATIONS

Remote Procedure Call—Wikipedia, the free encyclopedia, Jan. 6, 2012.

* cited by examiner

*Primary Examiner* — Masud Ahmed
(74) *Attorney, Agent, or Firm* — Nixon & Vanderhye, P.C.

(57) ABSTRACT

A first information processor executes a program or a routine which uses wireless communication and transmits, while the program or the routine is being executed, identification information for identifying the program or the routine to an unspecified apparatus. A second information processor receives the identification information transmitted from the first information processor to the unspecified apparatus and selects, from among a plurality of programs or a plurality of routines stored in the second information processor, a program or a routine corresponding to the identification information as a program or a routine to be executed.

16 Claims, 8 Drawing Sheets

INFORMATION PROCESSING SYSTEM, COMPUTER-READABLE NON-TRANSITORY STORAGE MEDIUM, INFORMATION PROCESSING METHOD AND INFORMATION PROCESSOR

CROSS REFERENCE TO RELATED APPLICATION

The disclosures of Japanese Patent Application No. 2012-035351 and Japanese Patent Application No. 2012-035352, filed on Feb. 21, 2012, are incorporated herein by reference.

FIELD

The technology shown here relates to an information processing system, a computer-readable non-transitory storage medium, an information processing method and an information processor, and more particularly to an information processing system, a computer-readable non-transitory storage medium, an information processing method and an information processor which use wireless communication.

BACKGROUND AND SUMMARY

Conventionally, wireless communication devices which perform wireless communication with other wireless communication devices in a communicable range using wireless communication have been known.

An objective of the present technology is to provide an information processing system, a computer-readable non-transitory storage medium, an information processing method and an information processor in which an application that uses wireless communication can be easily started.

The above objective is attained by, for example, exemplary configurations described below.

A first exemplary configuration is an information processing system including a first information processor and a second information processor each having a wireless communication function. The first information processor comprises: a first execution unit which executes a program or a routine which uses wireless communication; and a first transmission unit which transmits, while the program or the routine is being executed, identification information for identifying the program or the routine to an unspecified apparatus. The second information processor comprises: a second reception unit which receives the identification information transmitted from the first information processor to the unspecified apparatus; a selection unit which selects, from among a plurality of programs or a plurality of routines stored in the second information processor, a program or a routine corresponding to the identification information received by the second reception unit as a program or a routine to be executed; and a second execution unit which executes the program or the routine selected by the selection unit.

The first transmission unit may transmit a beacon at predetermined intervals, thereby transmitting the identification information to the unspecified apparatus.

The second execution unit may execute the program or the routine selected by the selection unit, thereby conducting wireless communication with the first information processor.

The program or the routine executed by the first execution unit and the second execution unit may be a program or a routine of an application which allows participation of a user of the first information processor together with a user of the second information processor using wireless communication.

The second information processor may comprise an inquiry unit which asks the user, before the program or the routine selected by the selection unit is executed by the second execution unit, whether or not to execute the selected program or routine.

The selection unit automatically may select the program or the routine corresponding to the identification information received by the second reception unit. The second execution unit may automatically execute the program or the routine selected by the selection unit.

The first execution unit and the second execution unit may execute a program or a routine which uses wireless communication between the first information processor and the second information processor without establishing connection between the first information processor and the second information processor.

The first transmission unit may repeatedly transmit, while the program or the routine is being executed, predetermined data used in the program or the routine together with the identification information to the unspecified apparatus. The second reception unit may receive the identification information and the predetermined data transmitted from the first information processor to the unspecified apparatus. The second execution unit may execute the program or the routine using the predetermined data received by the second reception unit.

The second information processor may comprise a second transmission unit which repeatedly transmits, while the program or the routine is being executed, predetermined data used in the program or the routine together with identification information for identifying the program or the routine to the unspecified apparatus. The first information processor may comprise a first reception unit which receives the predetermined data transmitted from the second information processor to the unspecified apparatus. The first execution unit may execute the program or the routine using the predetermined data received by the first reception unit.

The program or the routine executed by the first execution unit and the second execution unit may be a program or a routine of an application which allows, in a mission started by a user of the first information processor, participation of a user of the second information processor in the middle of the mission. The predetermined data may be data of a progress of the mission being executed.

The program or the routine may be a program or a routine for a game process.

A second exemplary configuration is a computer-readable non-transitory storage medium having stored therein an information processing program which causes a computer of an information processor having a wireless communication function to function as: a reception unit which receives identification information which is transmitted from another information processor to an unspecified apparatus and is information for identifying a program or a routine which uses wireless communication and is currently being executed in the other information processor; a selection unit which selects, from among a plurality of programs or a plurality of routines stored in the information processor, a program or a routine corresponding to the identification information received by the reception unit as a program or a routine to be executed; and an execution unit which executes the program or the routine selected by the selection unit.

The information processing program may be stored in any computer-readable storage medium (e.g., a flexible disk, a hard disk, an optical disk, a magneto-optical disc, a CD-ROM, a CD-R, a magnetic tape, a semiconductor memory card, a ROM, a RAM, and the like).

A third exemplary configuration is an information processing method performed in an information processing system including a first information processor and a second information processor each having a wireless communication function. The information processing method comprises: executing, in the first information processor, a program or a routine which uses wireless communication; transmitting, in the first information processor, while the program or the routine is being executed, identification information for identifying the program or the routine to an unspecified apparatus; receiving, in the second information processor, the identification information transmitted from the first information processor to the unspecified apparatus; selecting, in the second information processor, from among a plurality of programs or a plurality of routines stored in the second information processor, a program or a routine corresponding to the identification information having been received as a program or a routine to be executed; and executing, in the second information processor, the program or the routine having been selected.

A fourth exemplary configuration is an information processor having a wireless communication function. The information processor comprises: a reception unit which receives identification information transmitted from another information processor to an unspecified apparatus, the information being for identifying a program or a routine which uses wireless communication and is currently being executed in the other information processor; a selection unit which selects, from among a plurality of programs or a plurality of routines stored in the information processor, a program or a routine corresponding to the identification information received by the reception unit as a program or a routine to be executed; and an execution unit which executes the program or the routine selected by the selection unit.

According to the present technology, an application that uses wireless communication can be easily started.

BRIEF DESCRIPTION OF THE DRAWINGS

FIG. 2 shows a non-limiting example of a game image displayed on a hand-held game apparatus 10a;

FIG. 3 shows a non-limiting example of a game image displayed on the hand-held game apparatus 10a;

FIG. 4 shows a non-limiting example of a game image displayed on the hand-held game apparatus 10a;

FIG. 5 shows a non-limiting example of a game image displayed on the hand-held game apparatus 10a;

FIG. 6 shows a non-limiting example of how a mission beacon is transmitted from the hand-held game apparatus 10a;

DETAILED DESCRIPTION OF NON-LIMITING EXAMPLE EMBODIMENTS

Hereinafter, an exemplary embodiment of the present technology will be described.

Figure 1:
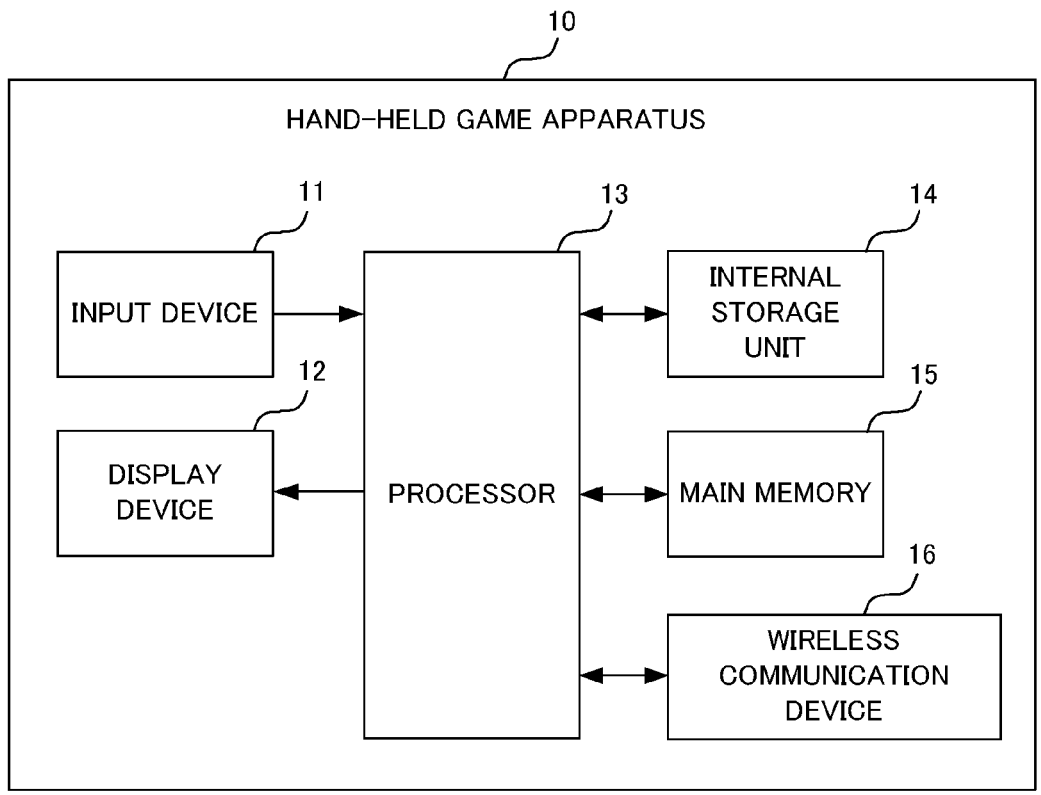
FIG. 1 is a block diagram showing a non-limiting configuration example of a hand-held game apparatus 10.

In FIG. 1, a hand-held game apparatus 10 includes an input device 11, a display device 12, a processor 13, an internal storage unit 14, a main memory 15, and a wireless communication device 16.

The input device 11 is operated by a user of the hand-held game apparatus 10 and outputs a signal based on an operation by the user. The input device 11 is, for example, a cross switch, a push button, or a touch panel.

The display device 12 displays an image generated by the hand-held game apparatus 10 on a screen. Typically, the display device 12 is a liquid crystal display.

The internal storage unit 14 stores a computer program executed by the processor 13. Typically, the internal storage unit 14 is a flash EEPROM.

The main memory 15 temporarily stores the computer program and information.

The wireless communication device 16 transmits/receives a signal to/from another hand-held game apparatus via wireless communication.

Next, an outline of an operation of the hand-held game apparatus 10 will be described.

Figure 2:
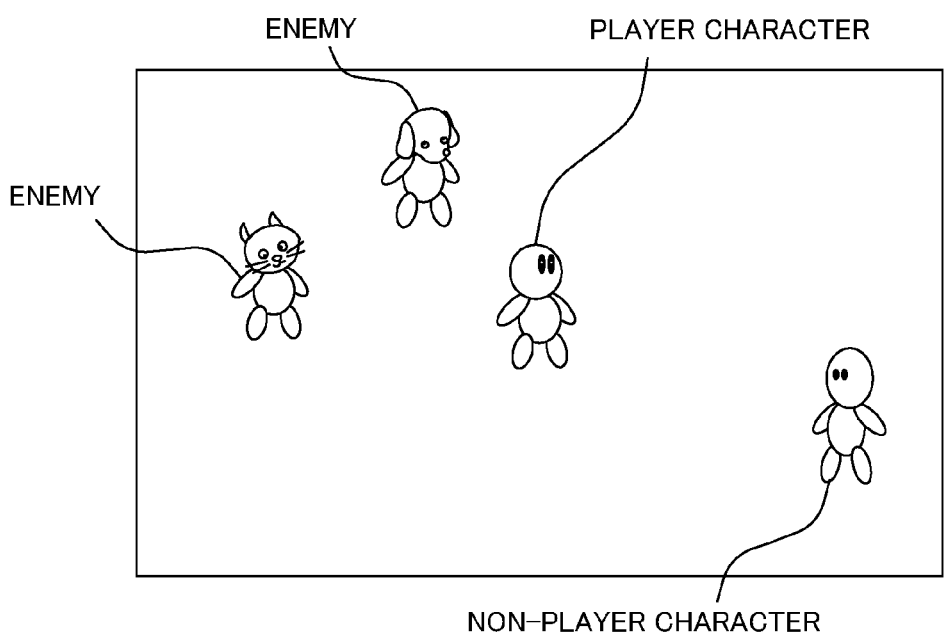

A user (player) of the hand-held game apparatus 10 can play a game for a single player (hereinafter, referred to as single player game) using the hand-held game apparatus 10. FIG. 2 shows an example of a game image displayed on the display device 12 while the single player game is being executed. On the display device 12, a game world including a player character controlled by the player, non-player characters (NPC), enemies, and the like which are controlled by a computer is displayed. The player aims to achieve an objective (e.g., defeating a boss character) of the single player game by controlling the player character.

Figure 3:
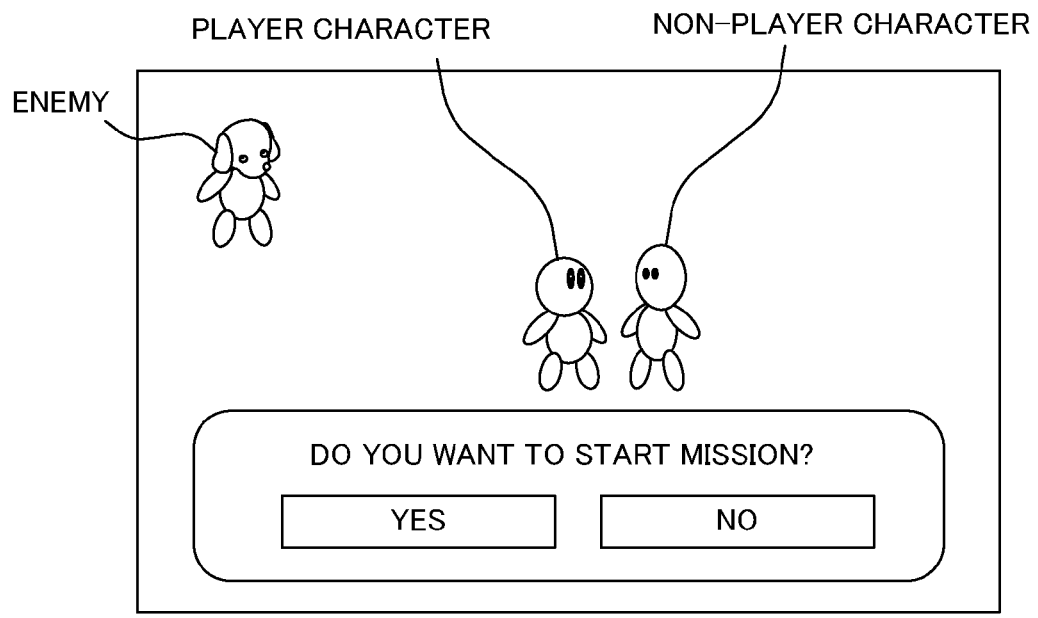

When a predetermined condition (e.g., talking to a specific non-player character, or moving to a specific place in the game world) is satisfied during play of the single player game, a message asking the player whether or not to start a "mission" is displayed as shown in FIG. 3. The "mission" is a game aimed at achieving an objective different from that of the single player game in the same game world as the single player game. A plurality of kinds of missions are provided in advance. As will be described below, the mission may be a game in which a single player or a plurality of players together aim to achieve a predetermined objective, or a game in which a plurality of players compete with each other to achieve a predetermined objective.

Figure 4:
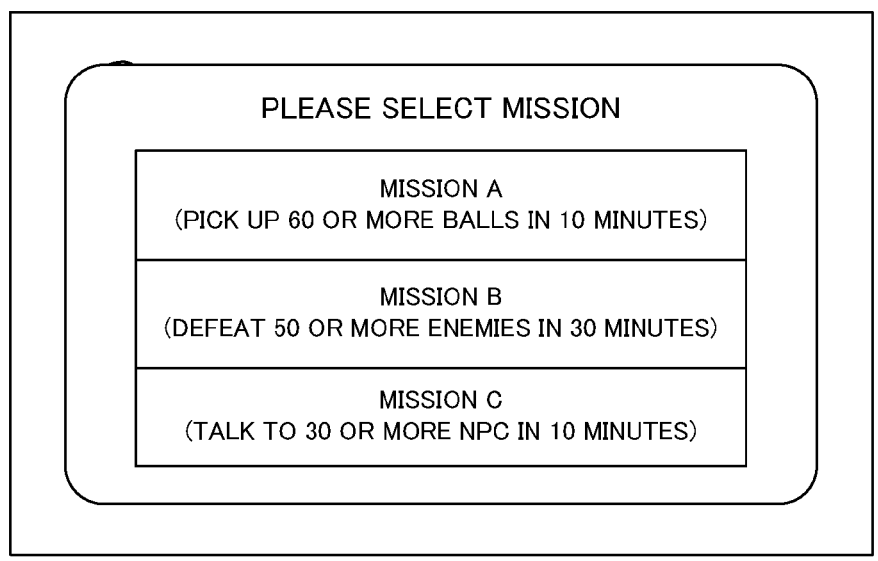

When the player selects "YES" in FIG. 3, a list of missions is displayed as shown in FIG. 4. In an example of FIG. 4, three missions which are "mission A," "mission B," and "mission C" are displayed. "The mission A" is "to pick up 60 or more balls in 10 minutes." "The mission B" is "to defeat 50 or more enemies in 30 minutes." "The mission C" is "to talk to 30 or more non-player characters in 10 minutes." The player can select a desired mission from the list.

When the player selects "the mission A" in FIG. 4, the mission A is started in the same game world as the single player game that the player has been playing until then. That is, the player can enjoy the mission in parallel with the single player game that he/she has been playing until then without suspending it.

Figure 5:
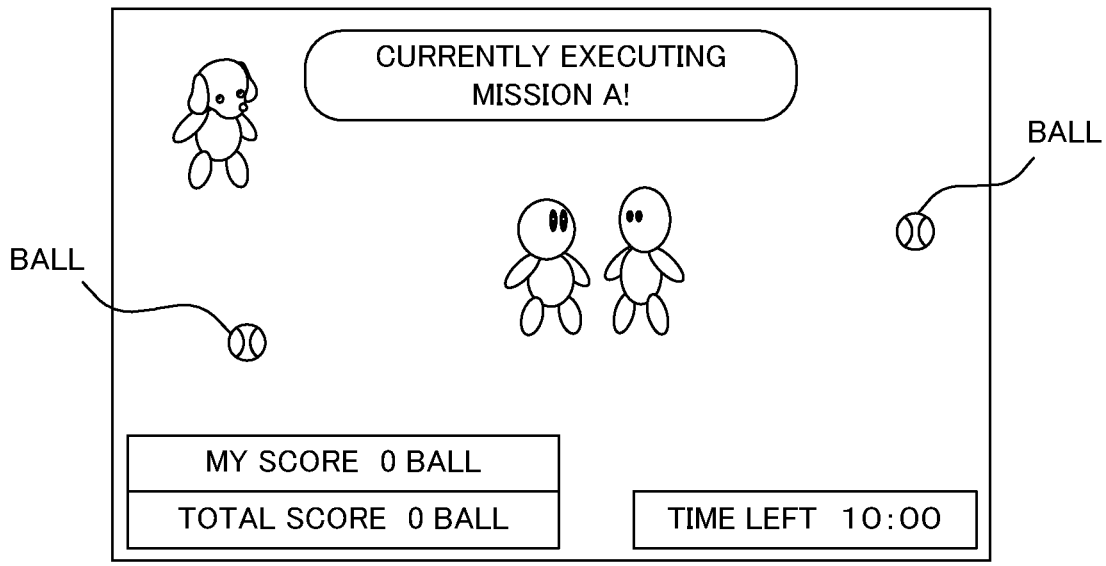

When the mission A is started, a plurality of balls appear in a field of the game world of the single player game as shown in FIG. 5. While the mission is being executed, information (my score, total score, time left, and the like) of a progress status of the mission is displayed in addition to the game image of the single player game as shown in FIG. 5, and the information is updated in real time.

Figure 6:
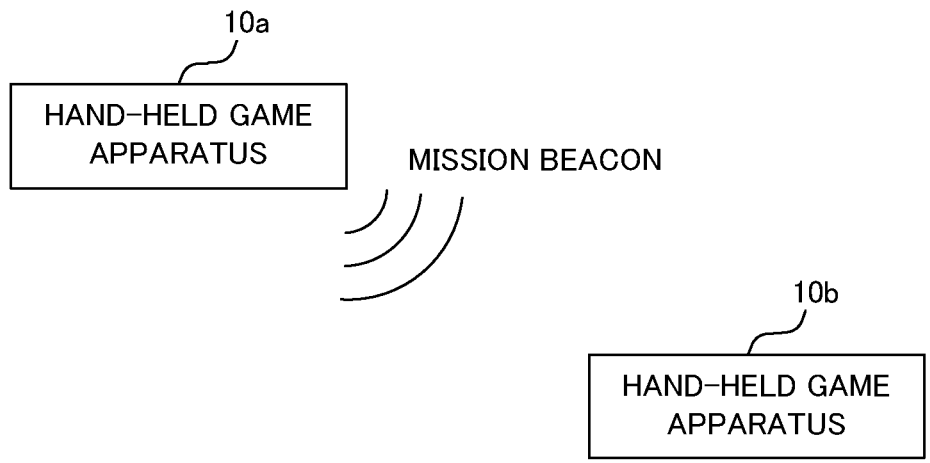
Figure 12:
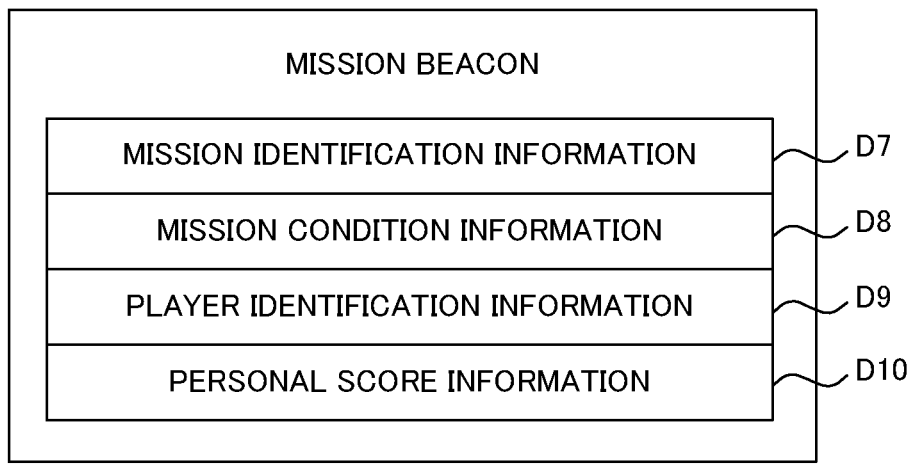
FIG. 12 shows a non-limiting example of information included in a mission beacon.

Once the mission A is started, the hand-held game apparatus 10 (hereinafter, referred to as hand-held game apparatus 10a so as to distinguish it from other hand-held game apparatuses 10) periodically (e.g., at intervals of 100 ms) broadcasts a beacon signal (hereinafter, referred to as mission beacon) that includes information of the mission currently being executed via the wireless communication device 16 as shown in FIG. 6. The mission beacon includes, as will be described later, mission identification information, mission condition information, player identification information, personal score information, and the like (FIG. 12).

As shown in FIG. 6, when another hand-held game apparatus 10b which is currently executing the same game (single player game) as the hand-held game apparatus 10a exists in a receivable range of the mission beacon of the hand-held game apparatus 10a, the other hand-held game apparatus 10b can receive the mission beacon of the hand-held game apparatus 10a.

Figure 7:
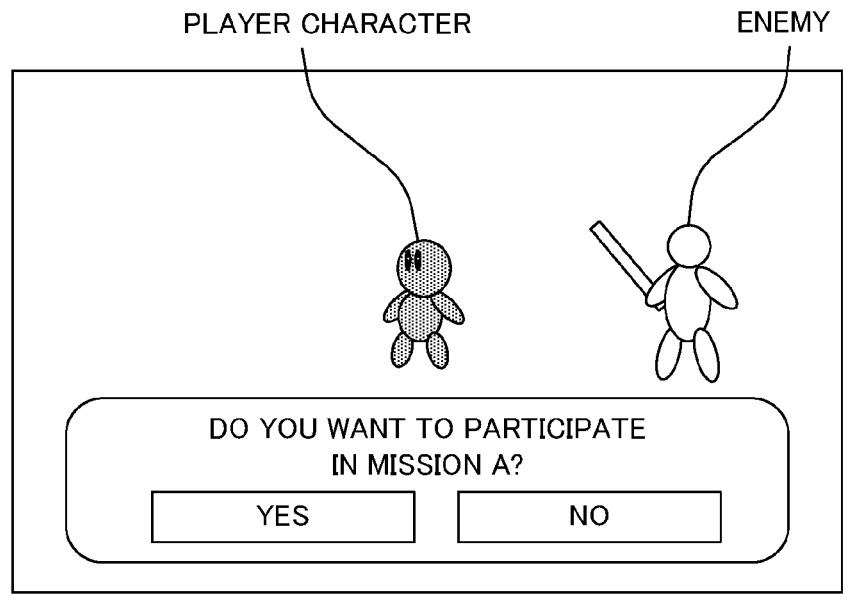
FIG. 7 shows a non-limiting example of a game image displayed on a hand-held game apparatus 10b.

Upon receipt of the mission beacon of the hand-held game apparatus 10a, the hand-held game apparatus 10b displays a message asking a player thereof whether or not to participate in the mission currently being executed in the hand-held game apparatus 10a as shown in FIG. 7. In a description below, the player of the hand-held game apparatus 10a and the player of the hand-held game apparatus 10b are referred to as player A and player B, respectively.

Figure 8:
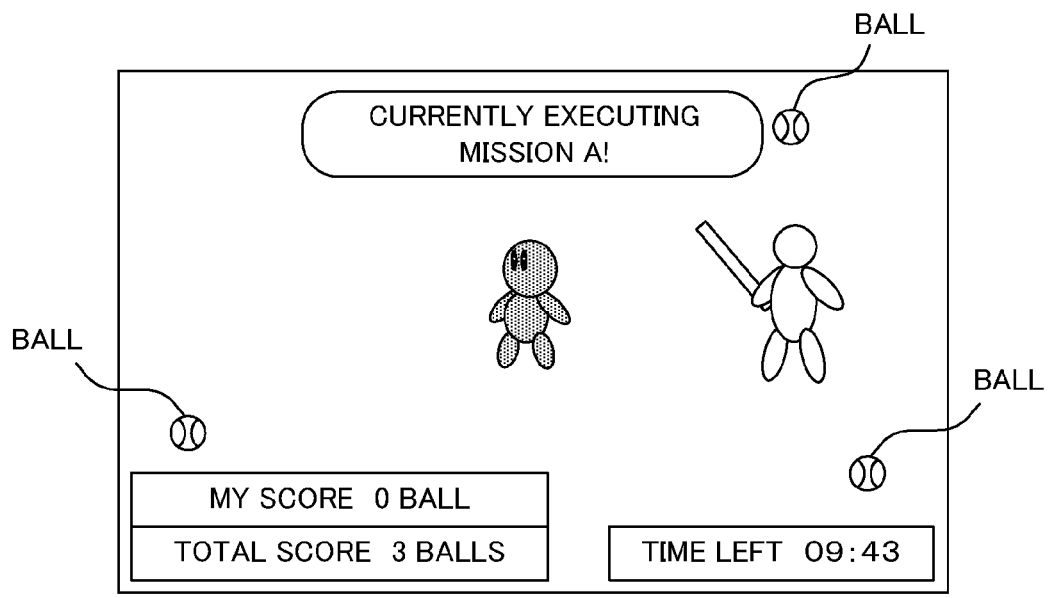
FIG. 8 shows a non-limiting example of a game image displayed on the hand-held game apparatus 10b.

When the player B selects "YES" in FIG. 7, the mission A is started in the same game world as the single player game that the player B has been playing until then as shown in FIG. 8. That is, the player B can also enjoy the mission in parallel with the single player game that he/she has been playing until then without suspending it.

Similarly to the hand-held game apparatus 10a, when the mission A is started in the hand-held game apparatus 10b, a plurality of balls appear in a field of the game world of the single player game and information of a progress status of the mission is displayed as shown in FIG. 8. At a time point of FIG. 8 (that is, a time point immediately after the player B's participation in the mission A), a time left is 9:43 instead of 10:00 because 17 seconds has passed from a time point at which the mission A is started in the hand-held game apparatus 10a. The mission beacon of the hand-held game apparatus 10a received by the hand-held game apparatus 10b includes score information of the player A. Consequently, while a my score is 0, a total score is 3. It should be noted that a my score is a player's own personal score while a total score is a sum of personal scores of all of players who are participating in a same mission. Accordingly, a condition (time left, total score, and the like) when the mission is started may vary according to a timing of participation in the mission.

Figure 9:
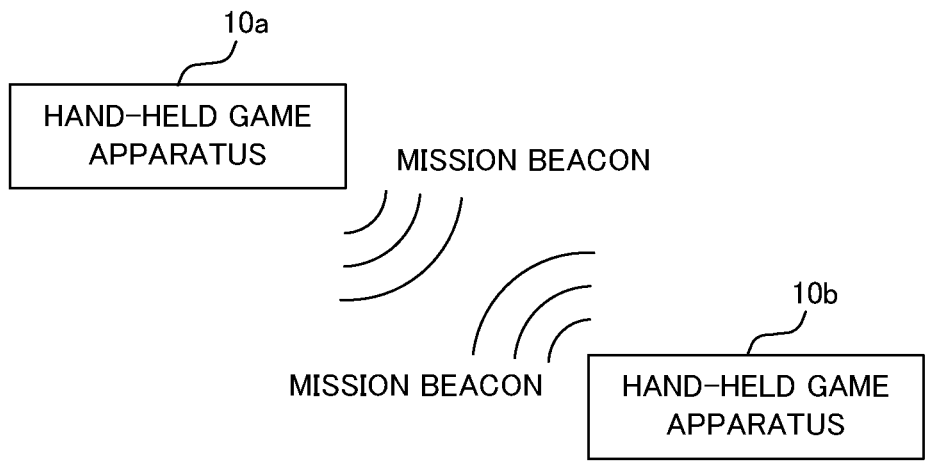
FIG. 9 shows a non-limiting example of how mission beacons are transmitted from the hand-held game apparatuses 10a and 10b, respectively.

Once the mission A is started in the hand-held game apparatus 10b, the hand-held game apparatus 10b also periodically broadcasts a mission beacon as shown in FIG. 9. Accordingly, until the end of the mission, the hand-held game apparatus 10a receives the mission beacon broadcasted periodically from the hand-held game apparatus 10b, and thereby the hand-held game apparatus 10a can obtain a personal score of the player B in real time and update the total score. Similarly, until the end of the mission, the hand-held game apparatus 10b also receives the mission beacon broadcasted periodically from the hand-held game apparatus 10a, and thereby the hand-held game apparatus 10b can obtain a personal score of the player A in real time and update the total score.

In a case of the mission A, it is determined that the mission has been successful if 60 or more balls are picked up in 10 minutes. The determination is made based on the total score but not on the respective personal scores. Consequently, if the player A and the player B pick up 45 balls and 30 balls, respectively, for example, the total score is 75 and it is determined that the mission has been successful. When it is determined that the mission has been successful, all the players (here, the player A and the player B) who have participated in the mission receive a reward (e.g., money, items, and the like in the game world) for success which is predetermined according to each mission.

Figure 10:
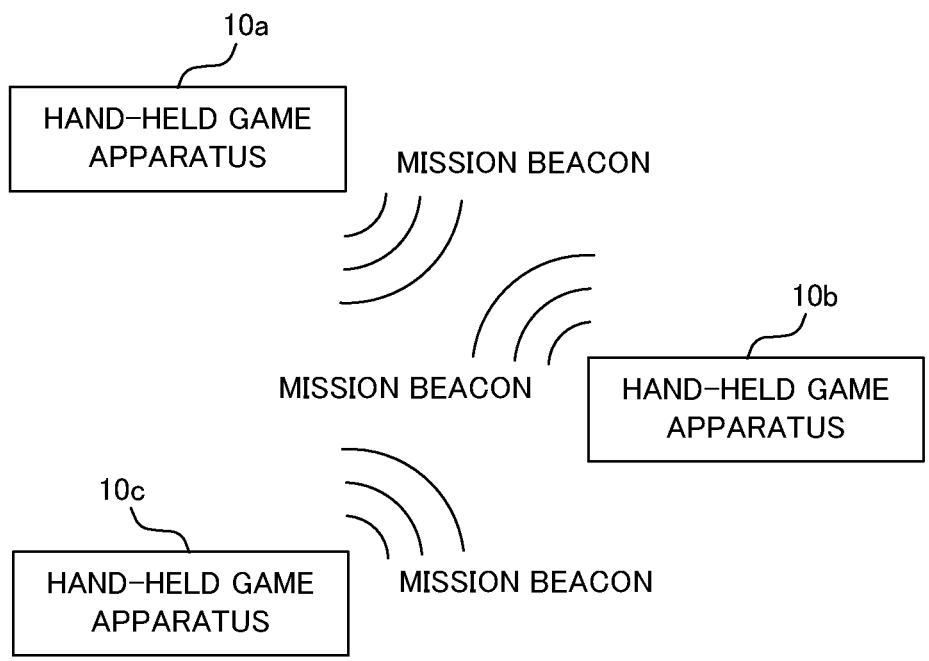
FIG. 10 shows a non-limiting example of how mission beacons are transmitted from the hand-held game apparatuses 10a, 10b, and a hand-held game apparatus 10c, respectively.

As described above, success/failure of the mission is determined based on the total score but not on the respective personal scores. Consequently, it is more advantageous when the number of players who participate in the mission is greater. For example, in an example of FIG. 10, in addition to the player B of the hand-held game apparatus 10b, a player C of a hand-held game apparatus 10c is participating in the mission started by the player A of the hand-held game apparatus 10a. In this case, the hand-held game apparatus 10a updates the total score, in real time, based on the mission beacon of the hand-held game apparatus 10b and a mission beacon of the hand-held game apparatus 10c. Similarly, the hand-held game apparatus 10b updates the total score, in real time, based on the mission beacon of the hand-held game apparatus 10a and the mission beacon of the hand-held game apparatus 10c. Similarly, the hand-held game apparatus 10c updates the total score, in real time, based on the mission beacon of the hand-held game apparatus 10a and the mission beacon of the hand-held game apparatus 10b.

As described above, according to the exemplary embodiment, a plurality of hand-held game apparatuses exchange information of a mission currently being executed among each other via mission beacons, thereby a plurality of players can participate in a same mission and play together.

Next, the operation of the hand-held game apparatus 10 will be described in detail with reference to FIG. 11 to FIG. 14.

Figure 11:
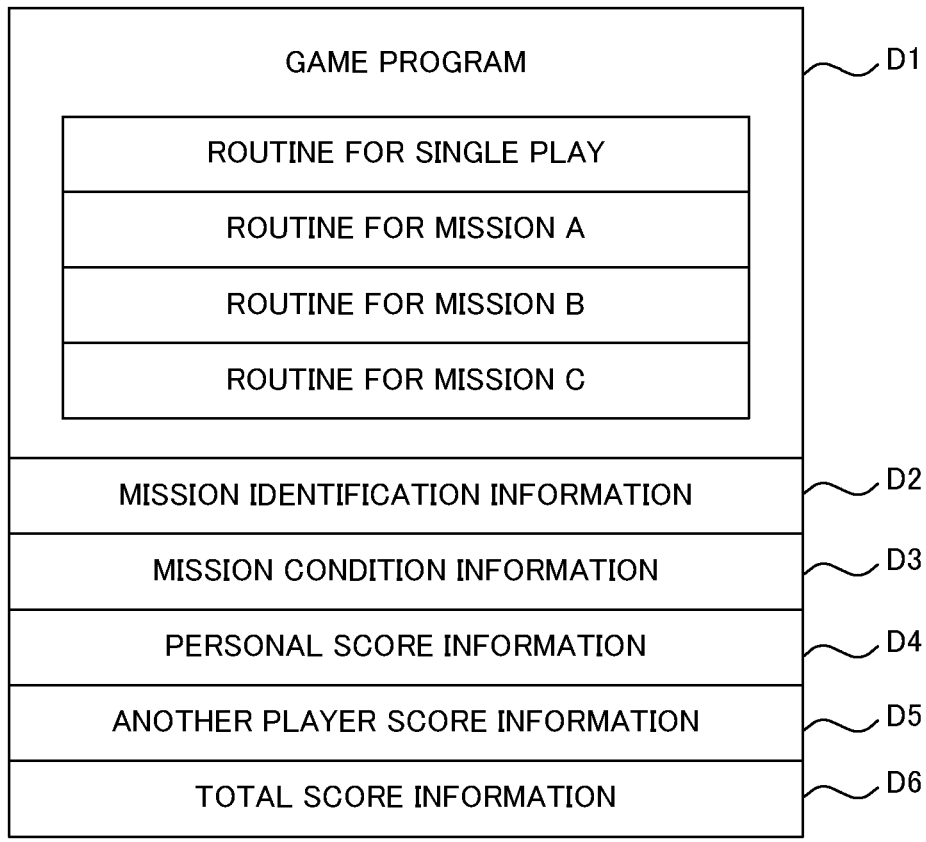
FIG. 11 shows a non-limiting example of a program and information stored in a main memory.

FIG. 11 shows an example of a program and information stored in the main memory 15 of the hand-held game apparatus 10.

A game program D1 is a computer program for causing the processor 13 to execute the above described single player game and the respective missions. The game program D1 is read out from the internal storage unit 14 and loaded into the main memory 15. The game program D1 includes a routine for executing the above described single player game and routines for executing the above described respective missions (mission A, mission B, mission C).

Mission identification information D2 is information for identifying a mission currently being executed.

Mission condition information D3 is information indicating a condition (e.g., mission end time and the like) of the mission currently being executed.

Personal score information D4 is information indicating a score of a player of an own hand-held game apparatus 10. The personal score information D4 is updated when, for example, a player character performs a predetermined action (action predetermined for each mission) in the own hand-held game apparatus 10.

Another player score information D5 is information indicating a score of a player of another hand-held game apparatus 10. The another player score information D5 is updated when, for example, a mission beacon from the other hand-held game apparatus 10 is received.

Total score information D6 is information indicating a sum of the score of the player of the own hand-held game apparatus 10 and the score of the player of the other hand-held game apparatus 10. The total score information D6 is updated when either the personal score information D4 or the another player score information D5 is updated.

FIG. 12 shows an example of data included in a mission beacon. The mission beacon includes mission identification information D7, mission condition information D8, player identification information D9, and personal score information D10.

The mission identification information D7 is information indicating a mission currently being executed. The mission identification information D7 may include a value determined randomly at a start of the mission in addition to information (e.g., a mission number and the like) for identifying each of a plurality of missions (mission A, mission B, and mission C in the exemplary embodiment) provided in advance. Accordingly, when a mission (e.g., mission A) having a common mission number is started in each of a hand-held game apparatus and another hand-held game apparatus, the mission can be identified.

Similar to the mission condition information D3, the mission condition information D8 is information indicating a condition (e.g., a mission end time and the like) of the mission currently being executed.

The player identification information D9 is information for identifying a hand-held game apparatus 10 which has transmitted the mission beacon or a player thereof. As the player identification information D9, information such as a player name and the like registered in the hand-held game apparatus 10 may be used. Alternatively, a serial number assigned to the hand-held game apparatus 10, a MAC address of the wireless communication device 16, and the like may be used.

The personal score information D10 is information indicating a score of a player of the own hand-held game apparatus 10.

Next, a flow of processing executed by the processor 13 of the hand-held game apparatus 10 based on the game program D1 will be described with reference to flow charts of FIG. 13 and FIG. 14.

Figure 13:
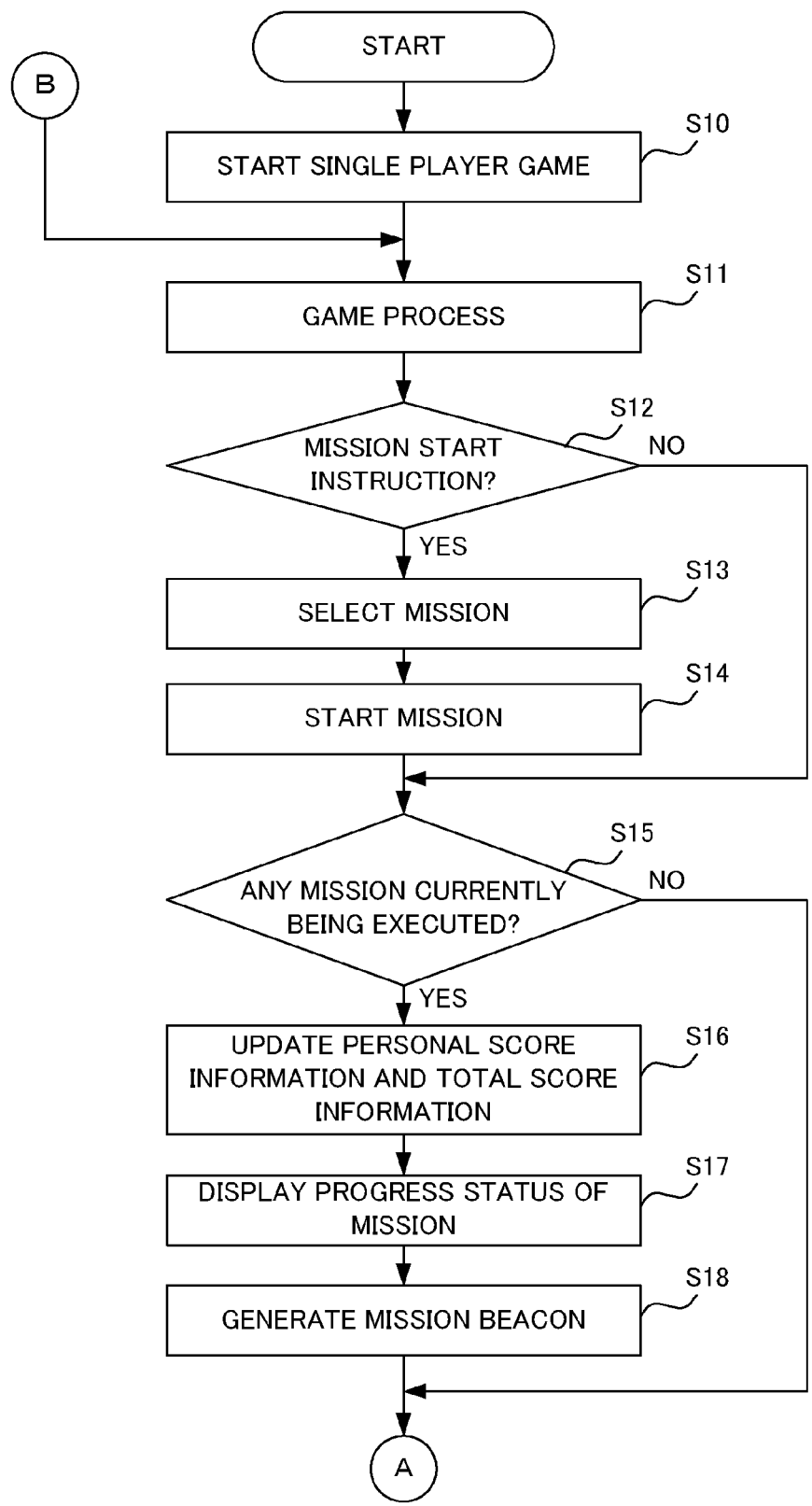
FIG. 13 shows a part of a flow chart illustrating a non-limiting example of processing executed by a processor.

Upon start of execution of the game program D1, the processor 13 firstly starts a single player game in step S10 of FIG. 13.

In step S11, the processor 13 performs a game process. The game process includes, for example, a process of controlling a player character based on a signal from the input device 11, a process of controlling an enemy and a non-player character based on a predetermined algorithm, a process of causing a predetermined event in a game world, a process of generating a game image and outputting the game image to the display device 12, and the like.

In step S12, the processor 13 determines whether a mission start instruction has been received from a player. Then, if the mission start instruction has been received from the player (for example, when "YES" is selected in FIG. 3), the processor 13 proceeds the processing to step S13. Otherwise, the processor 13 proceeds the processing to step S15.

In step S13, the processor 13 selects a mission from a plurality of missions provided in advance. The selection may be made based on an instruction from the player as shown in FIG. 4 or may be made automatically by the processor 13 based on a predetermined rule. At this time, the mission identification information D2 corresponding to the selected mission is stored in the main memory 15. Further, an end time and the like of the selected mission is calculated as appropriate and the calculated end time and the like is stored in the main memory 15 as the mission condition information D3.

In step S14, the processor 13 starts the mission selected in step S13. Specifically, the processor 13 starts to execute a routine for the mission selected in step S13 in parallel with a routine for the single player game of the game program D1. For example, a routine for the mission A includes a process of causing a plurality of balls appear in the game world when the mission A is started, a process of deleting one of the balls from the game world when the player character touches the ball and updating the personal score information D4 of the main memory 15, and the like.

In step S15, the processor 13 determines whether any of the missions is currently being executed in the own hand-held game apparatus 10. Then, if one of the missions is currently being executed, the processor 13 proceeds the processing to step S16. Otherwise, the processor 13 proceeds the processing to step S20 of FIG. 14.

In step S16, the processor 13 updates the personal score information D4 and the total score information D6 of the main memory 15 based on a result (i.e., a content of an action of the player character in the game world) of the game process in step S11. For example, while the mission A is being executed, points are added to a personal score each time the player character touches a ball. The total score information D6 can be calculated based on the personal score information D4 and the another player score information D5.

In step S17, the processor 13 displays information (e.g., my score, total score, time left in FIG. 5, and the like) of a progress status of the mission currently being executed. The my score can be obtained from the personal score information D4 of the main memory 15. The total score can be obtained from the total score information D6 of the main memory 15. The time left can be calculated based on a real-time clock (not shown) provided in the hand-held game apparatus 10 and the end time included in the mission condition information D3 of the main memory 15.

In step S18, the processor 13 generates a mission beacon as in FIG. 12 based on the personal score information D4 of the main memory 15 and the like. The generated mission beacon is broadcasted via the wireless communication device 16 at a predetermined timing. Then, the processor 13 proceeds the processing to step S20 of FIG. 14.

Figure 14:
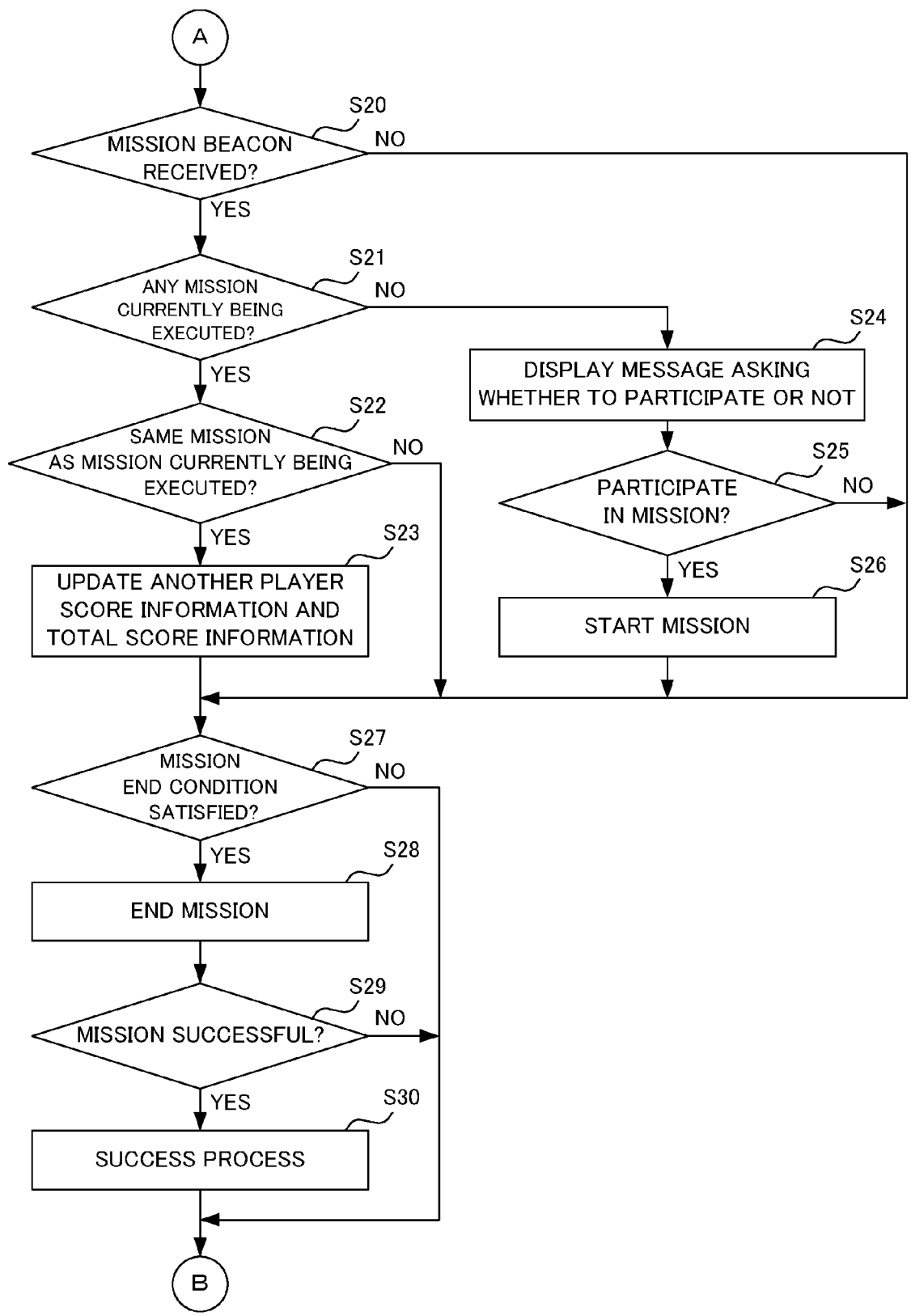
FIG. 14 shows a residual part of the flow chart illustrating the non-limiting example of the processing executed by the processor.

In step S20 of FIG. 14, the processor 13 determines whether a mission beacon of another hand-held game apparatus 10 has been received via the wireless communication device 16. Then, if the mission beacon of the other hand-held game apparatus 10 has been received, the processor 13 proceeds the processing to step S21. Otherwise, the processor 13 proceeds the processing to step S27.

In step S21, the processor 13 determines whether any of the missions is being executed in the own hand-held game apparatus 10. Then, if one of the missions is currently being executed, the processor 13 proceeds the processing to step S22. Otherwise, the processor 13 proceeds the processing to step S24.

In step S22, the processor 13 determines whether the mission indicated by the received mission beacon is the mission currently being executed in the own hand-held game apparatus 10. The determination is made by, for example, collating the mission identification information D7 included in the received mission beacon with the mission identification information D2 of the main memory 15. Then, if the mission indicated by the received mission beacon is the mission currently being executed in the own hand-held game apparatus 10, the processor 13 proceeds the processing to step S23. Otherwise, the processor 13 proceeds the processing to step S27.

In step S23, the processor 13 updates the another player score information D5 and the total score information D6 of the main memory 15 based on the player identification information D9 and the personal score information D10 included in the received mission beacon.

In step S24, the processor 13 displays a message (e.g., the message in FIG. 7) asking the player of the own hand-held game apparatus 10 whether or not to participate in the mission (that is, the mission already started in the other hand-held game apparatus 10) corresponding to the mission identification information D7 included in the received mission beacon.

In step S25, the processor 13 determines whether the player of the own hand-held game apparatus 10 participates in the mission (for example, whether the player has selected "YES" in FIG. 7). Then, if the player of the own hand-held game apparatus 10 participates in the mission, the processor 13 proceeds the processing to step S26. Otherwise, the processor 13 proceeds the processing to step S27.

In step S26, the processor 13 starts the mission corresponding to the mission identification information D7 included in the received mission beacon. Specifically, the processor 13 starts to execute a routine for the mission corresponding to the mission identification information D7 included in the received mission beacon in parallel with the routine for the single player game of the game program Dl. For example, if the mission identification information D7 included in the received mission beacon indicates the mission A, the processor 13 starts to execute the routine for the mission A. Similarly, if the mission identification information D7 included in the received mission beacon indicates the mission B, the processor 13 starts to execute a routine for the mission B.

It should be noted that when the mission is started in step S26, the mission identification information D2 and the mission condition information D3 are stored in the main memory 15 based on the mission identification information D7 and the mission condition information D8 included in the received mission beacon.

In step S27, the processor 13 determines whether a mission end condition is satisfied. Examples of the mission end condition are that an end condition (for example, that a predetermined time period has elapsed, that the total score has reached a predetermined value, and the like) predetermined for each mission is satisfied, that a mission end instruction has been received from the player in the middle of the mission, and the like. Then, if the mission end condition is satisfied, the processor 13 proceeds the processing to step S28. Otherwise, the processor 13 returns the processing to step S11 of FIG. 13.

In step S28, the processor 13 ends the mission. In case of the mission A, for example, a process of deleting all of the balls which have appeared in the game world at the start of the mission from the game world, and the like is performed.

In step S29, the processor 13 determines whether or not the mission has been successful. Whether or not the mission has been successful is determined, for example, based on whether the total score indicated by the total score information D6 of the main memory 15 has reached a target total score predetermined for each mission. Then, if the mission has been successful, the processor 13 proceeds the processing to step S30. Otherwise, the processor 13 returns the processing to step S11 of FIG. 13.

In step S30, the processor 13 performs a success process. An example of the success process may be granting a reward (e.g., money, items, and the like in the game world) for success predetermined according to each mission, and the like.

The above described processes in steps S11 to S30 are repeated at predetermined intervals (e.g., intervals of 1/60 sec), thereby the single player game is advanced. Occasionally, a mission in which a single player or a plurality of players participate is advanced in parallel with the single player game.

As described above, according to the exemplary embodiment, a plurality of hand-held game apparatuses 10 exchange mission beacons among themselves, thereby a mission is advanced. Thus, there is no need to establish connection between one hand-held game apparatus 10 and another hand-held game apparatus 10. Consequently, no wait time for connection establishment and the like is needed, which allows a player to participate in the mission instantly.

Further, according to the exemplary embodiment, even when a number of game apparatuses which can be connected concurrently is limited, a multiple player game can be enjoyed in the number of game apparatuses exceeding the limit because there is no need to establish connection between one hand-held game apparatus 10 and another hand-held game apparatus 10.

Further, according to the exemplary embodiment, in the hand-held game apparatus 10 which has received a mission beacon, based on mission identification information included in the received mission beacon, a mission (routine for the mission) corresponding to the mission identification information is automatically selected from a plurality of missions provided in advance. Accordingly, a player of the hand-held game apparatus 10 which has received the mission beacon can easily participate in the mission started by another player without manually selecting the corresponding mission from the plurality of missions provided in advance.

Further, according to the exemplary embodiment, while a mission is being executed, a total score is updated in real time based on personal score information included in a mission beacon of another hand-held game apparatus 10. Consequently, a player can feel as if the player is actually participating in a same mission with another player. That is, the player can feel as if the player is actually participating in the same mission with the other player because data of a progress of the mission in the other hand-held game apparatus 10 can be received from the other hand-held game apparatus 10.

Further, according to the exemplary embodiment, a mission is started in a same game world as a single player game without suspending the single player game. Thus, a player can participate in the mission without hesitation and without suspending the single player game.

Further, according to the exemplary embodiment, a mission beacon includes mission condition information (a mission end time and the like), which allows a mission to be executed under common conditions in a plurality of hand-held game apparatuses 10 (for example, the mission can be ended at the same time in the plurality of hand-held game apparatuses 10).

It is noted that the above exemplary embodiment is only for illustrative purposes and numerous other modifications can be devised.

For example, in the above exemplary embodiment, the hand-held game apparatus 10 is used. However, the present technology is not limited thereto, and any information processor (e.g., a mobile phone, a smartphone, a notebook computer, and the like) having a wireless communication function may be used.

Further, in the above exemplary embodiment, the game program which allows a plurality of players to participate in a same mission together is executed. However, the present technology is not limited thereto, and any application which allows users of a plurality of information processors to participate together using wireless communication may be executed. Further, any program or a routine which uses wireless communication between a plurality of information processors may be executed. For example, a program or a routine which causes a host apparatus to generate predetermined data and transmit the predetermined data to a client apparatus via wireless communication and causes the client apparatus to receive and process the predetermined data may be executed in the host apparatus and the client apparatus. Further, for example, a program or a routine which causes a client apparatus to generate predetermined data and transmit the predetermined data to a host apparatus via wireless communication and causes the host apparatus to receive and process the predetermined data may be executed in the host apparatus and the client apparatus.

Further, in the above exemplary embodiment, a mission beacon including the mission identification information is broadcasted from each of the hand-held game apparatuses 10 and a mission corresponding to the mission identification information included in the mission beacon is selected in the hand-held game apparatus 10 which has received the mission beacon. However, the present technology is not limited thereto. For example, a first information processor may broadcast identification information indicating a program or a routine being executed therein via a beacon signal and the like. Then, a second information processor which has received the broadcasted identification information may automatically select, from a plurality of programs or a plurality of routines stored in the second information processor, a program or a routine corresponding to the received identification information and start to execute the selected program or routine. Accordingly, in the second information processor, the program or the routine corresponding to the program or the routine being executed in the first information processor can be automatically selected and the selected program or routine executes wireless communication with the first information processor. Consequently, a user does not have to bother to manually select an appropriate program or routine. Therefore, the program or routine that uses wireless communication can be easily executed. It should be noted that the wireless communication executed by the selected program or routine may be conducted by using the beacon signal without establishing connection between the apparatuses as in the above exemplary embodiment, or may be conducted after the communication between the apparatuses is established.

Further, in the above exemplary embodiment, when the hand-held game apparatus 10 receives a mission beacon of the other hand-held game apparatus 10, the message asking the player of the hand-held game apparatus 10 whether or not to participate in the mission currently being executed in the other hand-held game apparatus 10 is displayed as shown in FIG. 7. However, the present technology is not limited thereto. In another embodiment, the player of the hand-held game apparatus 10 may automatically participate in the mission currently being executed in the other hand-held game apparatus 10 without being asked whether or not to participate in the mission currently being executed in the other hand-held game apparatus 10 (that is, a routine for the corresponding mission may be automatically started).

Further, in the above exemplary embodiment, success/failure of the mission is determined based on the total score obtained by summing the personal scores of all the players. However, the present technology is not limited thereto. The determination of the success/failure of the mission may be made by another method. For example, at a time point at which one of the players has first defeated a specific enemy, it may be determined that the player has succeeded in the mission and the rest of players have failed in the mission.

Further, in the above exemplary embodiment, the personal score of each player is broadcasted by the mission beacon. However, instead of the personal score, information indicating that the personal score has been increased may be broadcasted via the mission beacon each time the personal score of each player is increased. In this case, the personal score of the player corresponding to the mission beacon which is stored as the another player score information may be increased in each hand-held game apparatus 10 which has received the mission beacon.

Further, in the above exemplary embodiment, the information of the mission currently being executed is broadcasted by the beacon signal. However, the present technology is not limited thereto. The information of the mission currently being executed may be transmitted to an unspecified apparatus (that is, to be transmitted without being addressed to a specific apparatus) using a signal other than the beacon signal.

Further, in the above exemplary embodiment, the plurality of processes shown in FIG. 13 and FIG. 14 are executed by a single computer (the processor 13). However, in another embodiment, the plurality of processes may be shared and executed by a plurality of computers. Further, in another embodiment, a part of or all of the plurality of processes may be realized by a dedicated circuit.

Further, in the above exemplary embodiment, the plurality of processes shown in FIG. 13 and FIG. 14 are executed in a single information processor (the hand-held game apparatus 10). However, in another embodiment, the plurality of processes may be shared and executed by a plurality of information processors (e.g., the hand-held game apparatus 10 and a server apparatus).

Further, in the above exemplary embodiment, the game program D1 is loaded into the main memory 15 from the internal storage unit 14. However, in another embodiment, the game program D1 may be read from an external storage unit and loaded into the main memory 15, or may be received from another hand-held game apparatus 10 or a server apparatus and loaded into the main memory 15.

What is claimed is:

1. An information processing system including a first computing device and a second computing device, each of which includes a wireless transceiver and a processing system that includes a memory coupled to at least one hardware processor, the processing system of the first computing device programmed to:
execute a first application program in accordance with input provided by a user to the first computing device;
transmit to unspecified apparatus(es), while the first application program is being executed, identification information that identifies the first application program and/or a routine of the first application program, and the processing system of the second computing device programmed to:
receive, via the transceiver of the second computing device, the identification information transmitted from the first computing device to the unspecified apparatus(es); and responsive to reception of the identification information, initiate execution, from among a plurality of programs or a plurality of routines stored in the memory of the second computing device and not currently being executed by the second computing device, of at least one of the plurality of programs or at least one of a plurality of routines that corresponds to the received identification information, wherein in the initiated execution of the at least one of the plurality of programs or the at least one of the plurality of routines in response to reception of the identification information, the first and second computing devices respectively communicate with one another, via connectionless or broadcast transmissions performed by the respective transceivers, data regarding execution of a) the first application program and b) the at least one of the plurality of programs or the at least one of the plurality of routines.

2. The information processing system according to claim 1, wherein the identification information is transmitted as part of a beacon at predetermined intervals.

3. The information processing system according to claim 1, wherein the data communicated between the first and second computing devices is data related to performance of a cooperative-enabled task that allows, via the connectionless or broadcast transmissions, participation of the user of the first information processor together with a user of the second information processor using wireless communication towards completion of the cooperative-enabled task.

4. The information processing system according to claim 1, wherein the processing system of the second computing device is further programmed to:

presents a prompt as to whether or not the at least one of the plurality of programs or the at least one of the plurality of routines is to be executed.

5. The information processing system according to claim 1, wherein the at least one of the plurality of programs or the at least one of the plurality of routines is automatically executed in response to reception of the identification information.

6. The information processing system according to of claim 1, wherein:

predetermined data used in the program or the routine is transmitted together with the identification information to the unspecified apparatus(es), the at one of the plurality of programs or the at least one of the plurality of routines is executed using the predetermined data transmitted from the first computing device.

7. The information processing system according to claim 1, wherein:

the processing system of the second computing device programmed to:

transmit, while the at least one of the plurality of programs or the at least one of the plurality of routines is executed, predetermined data used in the at least one of the plurality of programs or the at least one of the plurality of routines together with identification information for identifying the at least one of the plurality of programs or the at least one of the plurality of routines to unspecified apparatus(es), the first application program is executed based on the predetermined data transmitted from the second computing device.

8. The information processing system according to claim 6, wherein the data relates to performance of a mission, which has been started by a user of the first computing device, in the first application program, the at least one of the plurality of programs or the at least one of the plurality of routines allow a user of the second computing device to participate in the mission after the mission has started, and the data includes data of a progress of the mission.

9. The information processing system according to claim 1, wherein the program or the routine is a program or a routine for a game process.

10. The information processing system of claim 1, wherein at least some of the data communicated from the second computing device to the first computing device via the connectionless or broadcast transmissions updates the executing first application program.

11. The information processing system of claim 1, wherein at least some of the data communicated from the first computing device to the second computing device via the connectionless or broadcast transmissions updates the executing at least one program or the executing at least one routine.

12. A computer-readable non-transitory storage medium having stored therein an information processing program for use with a second computing device configured to communicate with a first computing device, each of the first and second computing devices including a wireless transceiver and a processing system that includes a memory coupled to at least one hardware processor, the first computing device configured to at least a) execute a first application program in accordance with provided input, and b) transmit to unspecified apparatus(es), while the first application program is being executed, identification information that identifies the first application program and/or a routine of the first application program, the information processing program comprising instructions which cause the processing system of the second computing device to:

receive, via the transceiver of the second computing device, the identification information which is transmitted from the first computing device to the unspecified apparatus(es); and responsive to reception of the identification information, initiate execution, from among a plurality of programs or a plurality of routines stored in the memory of the second computing device and not currently being executed by the second computing device, of at least one of the plurality of programs or at least one of a plurality of routines that corresponds to the received identification information, wherein in the initiated execution of the at least one of the plurality of programs or the at least one of the plurality of routines in response to reception of the identification information, the first and second computing devices respectively communicate with one another, via connectionless or broadcast transmissions performed by the respective transceivers, data regarding execution of a) the first application program and b) the at least one of the plurality of programs or the at least one of the plurality of routines.

13. An information processing method performed by at least a first information processor and a second information processor, each of the first and second information processors including a wireless transceiver and a memory coupled to at least one hardware processor, the information processing method comprising:

executing, in the first information processor, a first application program in accordance with input provided by a user to the first computing device;

transmitting, by using the wireless transceiver of the first information processor and to unspecified apparatus(es), while the first application program or the routine is being executed, identification information that identifies the first application program and/or a routine of the first application program;

receiving, by using the transceiver of the second information processor, the identification information transmitted from the first information processor to the unspecified apparatus(es); and responsive to reception of the identification information, initiate execution, from among a plurality of programs or a plurality of routines stored in the memory of the second information processor and not currently being executed by the second information processor, of at least one of the plurality of programs or at least one of a plurality of routines that corresponds to the received identification information, wherein in the initiated execution of the at least one of the plurality of programs or the at least one of the plurality of routines in response to reception of the identification information, the first and second information processors respectively communicate with one another, via connectionless or broadcast transmissions performed by the respective transceivers, data regarding execution of a) the first application program and b) the at least one of the plurality of programs or the at least one of the plurality of routines.

14. An information processor configured to communicate with another information processor that is configured to at least a) execute a first application program in accordance with provided input, and b) transmit to unspecified apparatus(es), while the first application program is being executed, identification information that identifies the first application program and/or a routine of the first application program, the information processor comprising:

a wireless transceiver; and a processing system that includes a memory coupled to at least one hardware processor, the processing system configured to at least:

receive, via the wireless transceiver, the identification information transmitted from the another information processor to the unspecified apparatus(es); and responsive to reception of the identification information, initiate execution, from among a plurality of programs or a plurality of routines stored in the memory of the processing system and not currently being executed by the processing system, of at least one of the plurality of programs or at least one of a plurality of routines that corresponds to the received identification information, wherein in the initiated execution of the at least one of the plurality of programs or the at least one of the plurality of routines in response to reception of the identification information, the information processor and the another information processor respectively communicate with one another, via connectionless or broadcast transmissions performed by respective transceivers, data regarding execution of a) the first application program and b) the at least one of the plurality of programs or the at least one of the plurality of routines.

15. An information processing system comprising:

a first computing device that includes a wireless transceiver and a processing system with a memory coupled to at least one hardware processor, the processing system of the first computing device programmed to:

execute a first application program in accordance with input provided by a user, the first application program configured to present, via a display associated with the first computing device, a first game world to the user for interaction therewith;

while the user is experiencing the game world, initiate a cooperative-enabled task within the first game world, the cooperative-enabled task allowing other users of other computing devices to participate towards completion of the cooperative-enabled task; and transmit, using the wireless transceiver of the first computing device, an electronic data message that includes an identifier that corresponds to the cooperative-enabled task that has been initiated; and a second computing device that includes a wireless transceiver and a processing system with a memory coupled to at least one hardware processor, the processing system of the second computing device programmed to:

execute a second application program in accordance with input provided by a second user, the second application program configured to present, via a display associated with the second computing device, a second game world to the second user for interaction therewith, the second game world being a different instance of the first game world or a different game world than the first game world;

while the second application program is being executed and the second game world is presented to the second user, receive, via the transceiver of the second computing device, the transmitted data message;

responsive to reception of the data message with the included identifier, initiate a task within the second game world of the second application program that allows the second user to participate, by performing a task within the second game world, in the cooperative-enabled task initiated on the first computing device; and communicate with the first computing device, via the wireless transceiver of the second computing device, based on performance of the task within the second game world, the communication used to track progress of the cooperative-enabled task.

16. The information processing system of claim 15, wherein the communication with the first computing device based on performance of the task within the second game world is performed via broadcast or connectionless transmissions.

* * * * *